United States Patent [19]

Ermacora

[11] Patent Number: 4,723,396
[45] Date of Patent: Feb. 9, 1988

[54] MOWER

[75] Inventor: Rino Ermacora, Saverne, France

[73] Assignee: Kuhn, S.A., Saverne, France

[21] Appl. No.: 886,244

[22] Filed: Jul. 16, 1986

[30] Foreign Application Priority Data

Jul. 18, 1985 [FR] France .................. 85 11137

[51] Int. Cl.$^4$ .......................................... A01D 34/66
[52] U.S. Cl. ..................... 56/13.6; 56/15.2; 56/16.2
[58] Field of Search .............. 56/208, 209, 15.1, 15.2, 56/15.3, 15.5, 15.9, 15.8, 15.7, 16.2, 16.3, 13.6

[56] References Cited

U.S. PATENT DOCUMENTS

| 2,732,675 | 1/1956 | Smith et al. | |
| 3,548,572 | 8/1968 | Ferber | 56/208 |
| 3,574,990 | 4/1971 | Calder | 56/208 |
| 3,735,572 | 5/1973 | Kasberger | 56/15.8 |
| 3,959,957 | 6/1976 | Halls | 56/15.8 |
| 4,048,789 | 9/1977 | Cartner | 56/16.2 |
| 4,183,195 | 1/1980 | James | |
| 4,206,582 | 6/1980 | Molzahn et al. | 56/208 |
| 4,432,192 | 2/1984 | Maier et al. | 56/15.7 |

FOREIGN PATENT DOCUMENTS

| 1135233 | 8/1962 | Fed. Rep. of Germany . |
| 1582356 | 4/1970 | Fed. Rep. of Germany . |
| 2400894 | 7/1974 | Fed. Rep. of Germany . |
| 2722883 | 11/1978 | Fed. Rep. of Germany . |
| 1499066 | 9/1967 | France . |
| 2110911 | 6/1972 | France . |
| 2118738 | 7/1972 | France . |
| 2241230 | 3/1975 | France . |
| 2357163 | 2/1978 | France . |
| 1155819 | 6/1969 | United Kingdom . |

Primary Examiner—Stephen J. Novosad
Assistant Examiner—Bruce M. Kisliuk
Attorney, Agent, or Firm—Oblon, Fisher, Spivak, McClelland & Maier

[57] ABSTRACT

The connecting device 5 which links the mowing group 2 to the hitching device 3 comprises a connecting beam 21 and two connecting bars 38 and 39 that are connected respectively to the end of the connecting beam 21 and to the hitching device 3 by means of joints 36, 37, 40, and 41 so as to form with the hitching device 3 and the connecting beam 21 a deformable quadrilateral. The elastically deformable element 45 of the load-reducing mechanism 43 extends at least between two sides of the deformable quadrilateral, so as to create at the level of the connection 22, 23, 25, and 55 between the connecting beam 21 and the mowing group 2 a force directed upwardly.

35 Claims, 12 Drawing Figures

MOWER

FIELD OF THE INVENTION

This invention relates to a mower comprising a mowing group and a device for hitching the mowing group to a tractor. The mowing group is connected to the hitching device by a connecting device comprising a connecting beam. At the outboard end of the connecting beam, the mowing group is fastened by means of a joint including a pin directed at least approximately in the direction of work and located at least approximately in the vicinity of a vertical plane passing through the center of gravity of the mowing group. The mower furthermore comprising a load-reducing mechanism for the mowing group equipped with an elastically deformable element.

BACKGROUND OF THE INVENTION

The connecting device and the load-reducing mechanism are important elements of a mower because they make it possible for the mowing group to adapt itself to the configurations of the ground on which the mower operates so that the mowing group can perform good work. Moreover, certain mowers have a mowing group which has a bar that extends crosswise in relation to the direction of work and that slides on the ground. Under certain conditions, this bar has a tendency to jam because it can scrape the earth when it rests too heavily on the ground. The load-reducing mechanism is very important in this type of mower because it makes it possible to reduce the force with which the bar rests on the ground.

However, the connecting devices and the load-reducing mechanisms which equip current mowers are not always entirely satisfactory. In some cases, the adaptation to the ground that they make possible proves to be insufficient. In addition, some of these known devices are relatively complicated and bulky, which weighs down the mower and increases its price.

OBJECT OF THE INVENTION

The object of this invention is to equip mowers with a device for connecting the mowing group to the hitching device and with a load-reducing mechanism, which enable the mowing group of a mower to follow in an optimal manner all the configurations exhibited by the ground and not to jam, even under difficult working conditions.

SUMMARY OF THE INVENTION

For this purpose, the connecting device which links the mowing group to the hitching device includes additionally two connecting bars. Each of the connecting bars is connected at one end to the inboard end of the connecting beam at the outboard end of which the mowing group is connected. Furthermore, each of the connecting bars is connected at its other end to the hitching device. The connections between the connecting bars and the connecting beam and the hitching device is made by means of joints including a pin directed at least approximately in the direction of work. The connecting bars form, with the hitching device and the connecting beam, a deformable quadrilateral. Additionally, the elastically deformable element of the load-reducing mechanism extends at least between two sides of the deformable quadrilateral. The elastically deformable element is connected to the deformable quadrilateral so as to create a force directed upwardly at the level of the connection between the connecting beam and the mowing group.

With this construction, the adaptation of the mowing group to the ground is improved because the deformable quadrilateral allows a relatively large vertical clearance of the mowing group. Furthermore, the load-reducing mechanism creates, at the level of the mowing group, and optimal load reduction because the load-reducing forced is applied at least approximately in the vicinity of a vertical plane passing through the center of gravity of the mowing group.

According to another characteristic of the invention, the elastically deformable element extends between the hitching device and at least one of the other three sides of the deformable quadrilateral.

According to an additional characteristic of the invention, the deformable quadrilateral is at least approximately a parallelogram. This characteristic improves still further the adaptation of the mowing group to the ground, and it makes it possible for the connecting beam to remain, during movement, at least approximately parallel to the normal direction that it possesses when the mowing group rests on flat ground.

A relatively simple design is obtained when the elastically deformable element is connected to at least one of the connecting bars.

Moreover, it is very advantageous from the viewpoint of the design that the elastically deformable element be connected to the lower connecting bar.

When the two connecting bars are in their normal position (which is the position they are in when the mowing group rests on flat ground) approximately horizontal, the location of the connecting beam where the mowing group is hooked can vary without that having an appreciable influence on the return force developed by the elastically deformable element. This is important because it is generally advantageous to be able to move the hooking point of the mowing group to adapt the position of the mowing group to the path of the tractor vehicle to which the mower is attached. During this adaptation of the position of the mowing group to the path of the tractor vehicle, the return force to be developed by the elastically deformable element therefore remains at least approximately constant.

According to a first embodiment of the invention, it is possible to arrange the elastically deformable element in such a way that the return force that it exerts on the connecting bar to which it links is directed at least approximately parallel to the connecting bar. In this case, at least a part of the elastically deformable element can extend inside the space occupied by the hitching device. In this arrangement, it is advantageous for the point of application of the return force exerted by the elastically deformable element on the connecting bar to be selected in such a way that it does not introduce any unwanted force on the connecting bar. In the case of the lower connecting bar, for example, this point of application will be located at least approximately in the vicinity of a vertical plane passing through the point of articulation of the lower connecting bar to the hitching device.

According to a second embodiment of the invention, it is possible to arrange the elastically deformable element so that the return force that it exerts on the connecting bar to which it is linked is directed in a direction that extends upwardly. Advantageously, the direction of the return force is at least approximately perpendicular to the connecting bar on which the return force is exerted.

The return force to be exerted by the elastically deformable element on the connecting bar is all the more smaller as the point of application of the return force on the connecting bar extends in the vicinity of a vertical plane passing through the point of articulation of the connecting bar to the connecting beam.

When the two connecting bars are approximately horizontal, when the point of application of the return force exerted by the elastically deformable element on the connecting bar to which it is linked is located at least approximately in a vertical plane passing through the point of articulation of the connecting bar to the connecting beam and when the return force is directed approximately perpendicular to the connecting bar, then the return force is approximately equal to the value of the desired load reduction.

In the second embodiment, the elastically deformable element can extend in the direction along which it exerts the return force on the connecting bar to which it is linked. However, the elastically deformable element can also extend at least approximately horizontally and thereby be located, at least in part, inside the space occupied by the hitching device. In the latter case, the elastically deformable element can exert a return force on the connecting bar to which it is linked by at least one flexible pulling element which is wound at least partially on a guide linked to the hitching device so that, at the level of the connecting bar, the return force is directed upwardly. The guide preferably extends at the level of the point of articulation of the connecting bar to the connecting beam.

In the case where the elastically deformable element extends at least approximately horizontally, it can also exert a return force on the connecting bar to which it is linked by means of a knuckle joint.

The elastically deformable element preferably consists of a mechanical spring or of a hydropneumatic spring.

To prevent the mowing group from bouncing on the ground during work, according to an additional characteristic of the invention, a shock absorber device extends between at least two sides of the deformable quadrilateral.

According to a first embodiment, the shock absorber device extends between the hitching device and at least one of the other three sides of the deformable quadrilateral.

Advantageously, the shock absorber device is linked to one of the connecting bars. Preferably, the shock absorber device is linked to the lower connecting bar.

So that the shock-absorbing action exerted by the shock absorber device is nearly optimal, it extends approximately perpendicularly to the connecting bar to which it is linked. Advantageously, its connecting point on the connecting bar is located in the vicinity of a vertical plane passing through the point of articulation of the connecting bar to the connecting beam. An optimal arrangement is obtained when the connecting point of the shock absorber device on the connecting bar is located in a vertical plane passing through the point of articulation of the connecting bar to the connecting beam.

To be able to work with the mowing group along slopes inclined upwardly or downwardly, the invention provides that one of the connecting bars has a variable length. Preferably, it is the upper connecting bar that has a variable length.

According to an advantageous design, the connecting bar that has a variable length consists of an element that can be extended or retracted (such as a hydraulic jack, for example).

For transport, it is known to pivot the cutting bar backwardly in relation to the position that it occupies during work. In this position, the cutting bar extends behind the tractor vehicle. To achieve this, a particularly simple design is obtained when the hitching device comprises a hitching structure and a support element that is linked to the hitching structure by means of a pin directed upwardly. The connecting bars are linked to the support element so that the support element can pivot around the pin together with the connecting bars, the connecting beam, and the mowing group in relation to the hitching structure.

When the mowing group is relatively heavy (e.g., when the mowing group is a mowing group of large working width and/or is equipped with a device for conditioning the crop), it is advantageous to support the mowing group in part during transport by at least one wheel. This prevents the front wheels of the tractor vehicle from being too light and ensures that the front wheels of the tractor vehicle have a good ground grip.

In this case, the arrangement which has just been described is also very advantageous. In fact the elastically deformable element continues to work when the mowing group is in its transport position. In this way, the connection between the hitching structure and the rest of the mower is not rigid. Therefore, there is no danger of deformation or of breaking various elements of the mower when, for example, the tractor vehicle and the wheel or wheels which support the mowing group roll over an uneven surface.

DETAILED DESCRIPTION OF THE PRESENTLY PREFERRED EMBODIMENTS

Figure 1:
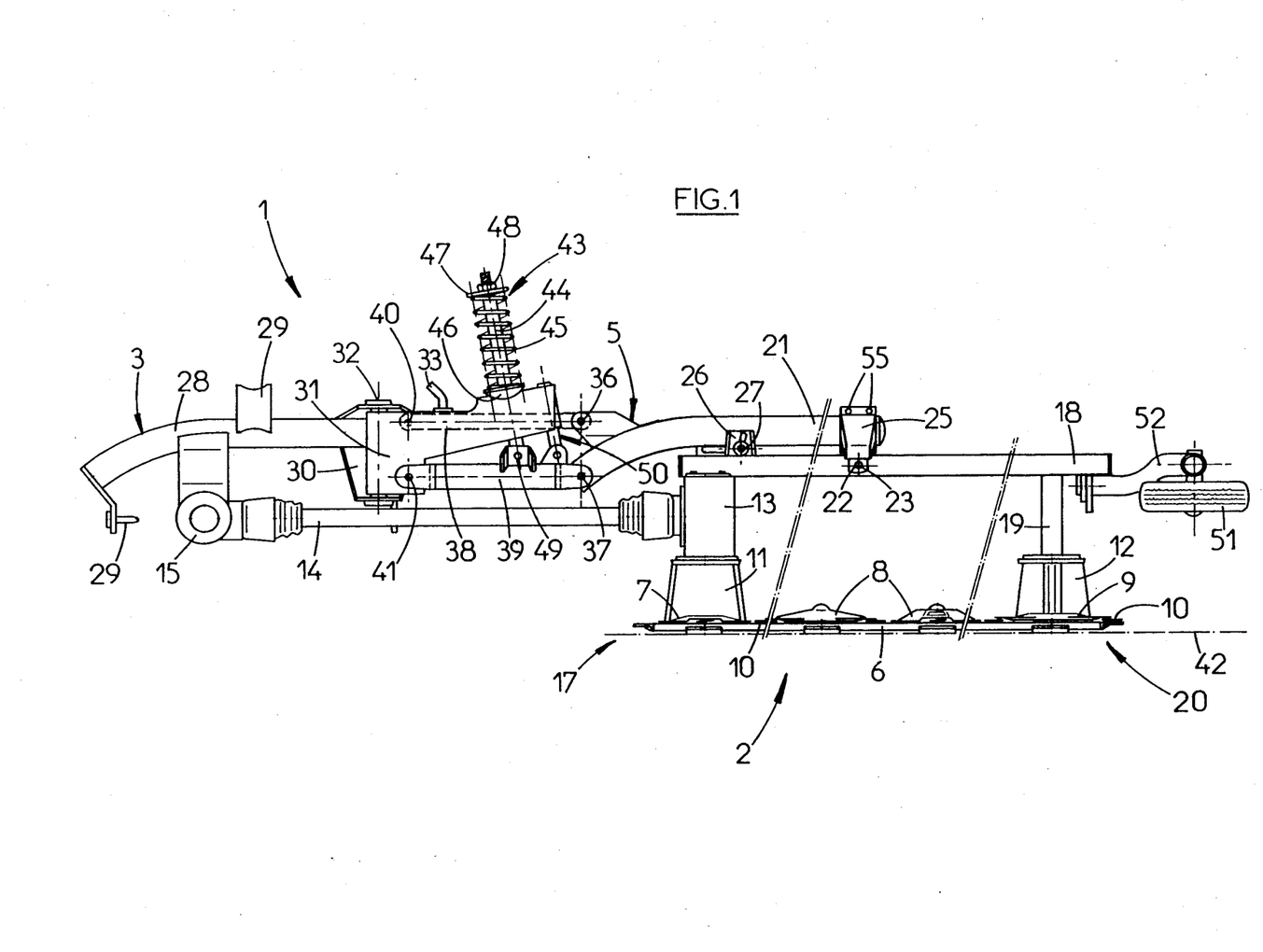
FIG. 1 is a view of the back of a mower according to the invention in its work position.
Figure 2:
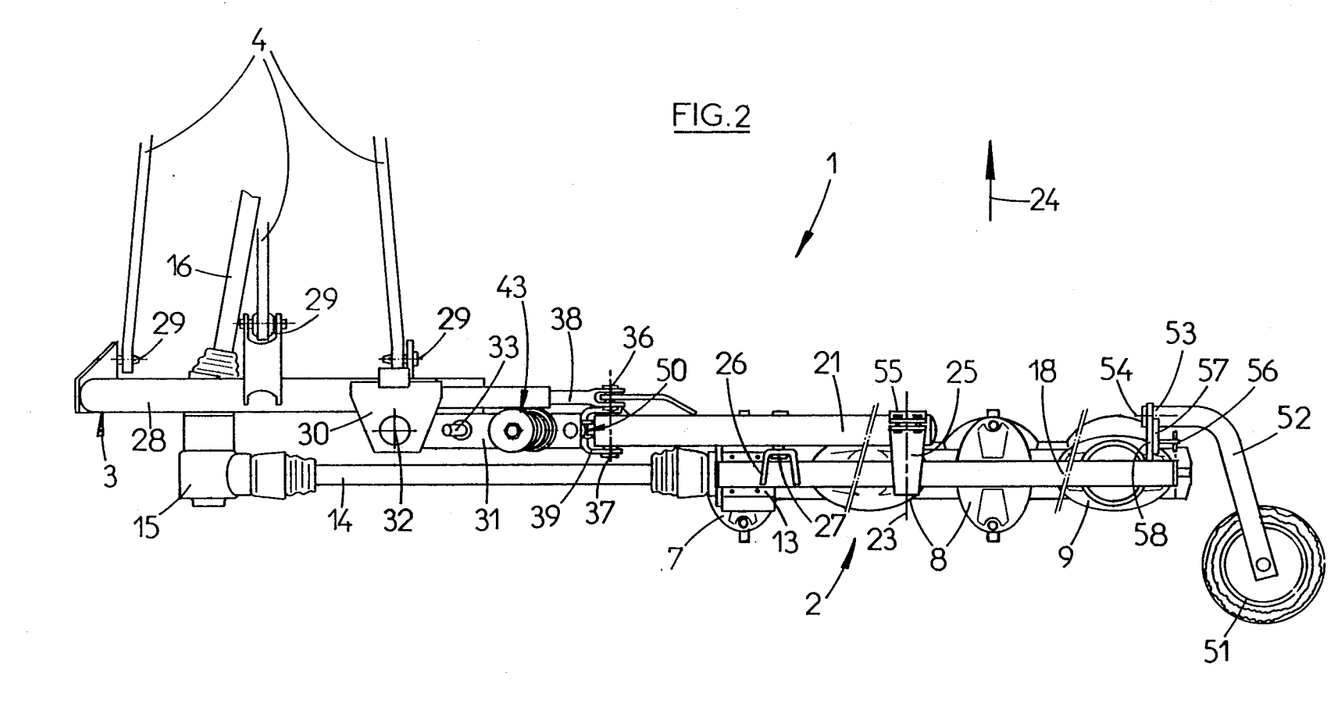
FIG. 2 is a top view of the mower of FIG. 1 in its work position.

In FIGS. 1 and 2, a mower 1 according to the invention is seen in its work position. It has a mowing group 2, a hitching device 3 which makes it possible to hitch the mower 1 to a tractor vehicle 4 (see FIG. 2) the hitch of which has been only partially represented, and a connecting device 5 connecting the mower group 2 to the hitching device 3.

The mower group 2 comprises a housing 6 at the upper part of which cutting elements 7, 8, and 9 are guided in rotation. The cutting elements 7, 8, and 9 are equipped with cutting tools 10. The inboard cutting element 7 is surmounted by a rotary drum 11, and the outboard cutting element 9 is surmounted by a rotary drum 12.

At the upper part of the rotary drum 11 surmounting the inboard cutting element 7 extends an input housing 13. The input housing 13 contains drive elements known in the art. A part of the drive elements passes through the upper part of the rotary drum 11 and drives the inboard cutting element 7 and the rotary drum 11, as well as other drive elements housed inside the housing 6. The other drive elements are also known in the art. They are used to drive the cutting elements 8 and 9 and the rotary drum 12 in rotation.

The drive of the various drive elements is performed by a shaft 14 with universal joints which extends between the input housing 13 and a transmission housing 15 fastened to the hitching device 3. The transmission housing 15 receives movement from the power take-off of the tractor vehicle 4, to which the mower 1 is hitched, by a shaft 16 with universal joints (see FIG. 2).

The input housing 13 also serves to link the left end 17 of the housing 6 to one of the ends of a support beam 18. At the other end, the support beam 18 is equipped with a leg 19 which extends downwardly and penetrates inside the rotary drum 12 through its upper part. The leg 19 serves to link the right end 20 of the housing 6 to the support beam 18.

At least approximately directly above the center of gravity of the mowing group 2, the support beam 18 is linked to the end of a connecting beam 21 by means of a joint 22 including a pin 23 directed at least approximately in the work direction indicated by an arrow 24 (see FIG. 2). For this purpose, the connecting beam 21 is equipped with a clevis 25. The clevis 25 is fastened to the connecting beam 21 using fastening means 55 which allow the shifting of the clevis 25 and the mowing group 2 along the longitudinal axis of the connecting beam 21. Thus, the position of the mowing group 2 can be adapted to the path of the tractor vehicle 4 to which the mower 1 is hitched.

The pivoting of the mowing group 2 around the joint 22 is restricted in both directions by a restricting section 26 mounted on the support beam 18. The restricting section 26 cooperates with an index 27 mounted on the connecting beam 21. The index 27 can also be shifted along the longitudinal axis of the connecting beam 21 during the adaptation of the mowing group 2 to the path of the tractor vehicle 4.

The hitching device 3 consists of a hitching structure 28 having three hitching points 29 which serve to connect the hitching structure 28 to the tractor vehicle 4.

At its end close to the mowing group 2, the hitching structure 28 includes a clevis 30. In the clevis 30, a support element 31 is articulated. The support element 31 can pivot in relation to the hitching structure 28 around an upwardly directed pivot pin 32. Pivoting of the support element 31 (which is a part of the hitching device 3) in relation to the hitching structure 28 is prevented when the mowing group 2 is in its work position (i.e., the position shown in FIGS. 1 and 2). The locking of the support element 31 in relation to the hitching structure 28 is performed by a bolt 33 which acts between the hitching structure 28 and the support element 31. For this purpose, the hitching structure 28 has a locking hole 34, and the support element 31 has a locking hole 35 (see FIG. 4).

At its end away from the clevis 25 (i.e., at its end adjacent to the hitching device 3), the connecting beam 21 is linked by means of pins 36 and 37 extending at least approximately in the work direction indicated by the arrow 24 to an upper at least approximately horizontal connecting bar 38 and to a lower at least approximately horizontal connecting bar 39.

At their other ends, the upper and lower connecting bars 38 and 39 are linked to the support element 31 by means of pins 40 and 41. The pins 40 and 41 extend at least approximately in the work direction indicated by the arrow 24.

The unit comprising the support element 31, the upper and lower connecting bars 38 and 39, and the connecting beam 21 thus forms a deformable quadrilateral. In the example shown in the FIGURES, the deformable quadrilateral is at least approximately a parallelogram. The connecting beam 21 thus moves while remaining at least approximately parallel to its position shown in FIG. 1. In this way, the possible pivoting angle of the mowing group 2 in both directions remains preserved even if the mowing group 2 works in a horizontal plane different from the horizontal plane 42 on which it rests in FIG. 1.

A load-reducing mechanism 43 is arranged between the lower connecting bar 39 and the support element 31. The load-reducing mechanism 43 has been able to be accommodated because, as can be seen in FIG. 2, the upper connecting bar 38 extends farther forward, considering the work direction indicated by the arrow 24, than the lower connecting bar 39 and than the support element 31. The load-reducing mechanism 43 includes a rod 44 threaded at its upper end and an elastically deformable element 45. The elastically deformable element 45, in the example illustrated in FIGS. 1 and 2, is a mechanical compression spring.

The rod 44 passes through the elastically deformable element 45, which is held between a circular washer 46 resting in a suitable housing in the support element 31 and a washer 47 held by a nut 48 screwed on the upper end of the rod 44.

At its other end, the threaded rod 44 is linked in an articulated manner to the connecting bar 39 via a clevis 49. The clevis 49 is as close as possible to the pin 37 which links the lower connecting bar 39 to connecting beam 21.

Furthermore, it is seen that the load-reducing mechanism 43 exerts on the lower connecting bar 39 a force directed upwardly and at least approximately perpendicularly to the lower connecting bar 39. The additional compression force introduced in the lower connecting bar 39 by the load-reducing mechanism 43 (i.e., the horizontal component of the force produced by the elastically deformable element 45) is thus relatively weak.

Thanks to this arrangement, the elastically deformable element 45 tends to pull the lower connecting bar 39 upward. This action also tends to pull the upper connecting bar 38 and the connecting beam 21 upwardly. This results in creating, at the level of the joint 22 and the pin 23, a force directed upwardly which acts oppositely to the weight of the mowing group 2. The mowing group 2 thus rests on the ground with an apparent weight lower than its real weight.

Thanks to the nut 48, the return force created by the elastically deformable element 45 (and therefore the load-reducing force) can be adjusted according to the conditions under which the mower must work.

Between the lower connecting bar 39 and the support element 31 also extends a shock absorber device 50 which is linked to each of those two elements by means of a joint. The shock absorber device 50 extends very close to the pin 37 which links the lower connecting bar 39 to the connecting beam 21. Furthermore, the shock absorber device 50 creates a shock absorbing action directed at least approximately perpendicularly to the lower connecting bar 39. The shock absorber device 50 prevents the mowing group 2 from bouncing on the ground over which it operates. This improves the work performed by the mowing group 2.

In FIG. 1, it is further seen that, at the outboard end of the support beam 18, a wheel 51 is placed. The wheel 51 is linked to a suspension arm 52. The suspension arm 52 is itself linked to the support beam 18 by means of a joint 53 the axis 54 of which is directed crosswise to the direction of advance indicated by the arrow 24. In FIGS. 1 and 2, the wheel 51 is in its work position. In this position, it is away from the ground so as not to interfere with the mowing performed by the cutting elements 7, 8, and 9. In FIG. 2, it is seen that the wheel 51 is held in this position by a bolt 56 which successively passes through a hole made in a plate 57 mounted on the suspension arm 52 and a hole made in a plate 58 mounted on the support beam 18.

The plate 57 mounted on the suspension arm 52 has another hole in which the bolt 56 is engaged when the wheel 51 is in its transport position. The mower 1 is shown in its transport position in FIGS. 3 and 4. In this position, the wheel 51 is in contact with the ground. The wheel 51 is held in this position by the bolt 56, which now passes successively through the second hole in the plate 57 mounted on the suspension arm 52 and the single hole in the plate 58 mounted on the support beam 18. In this position, the wheel 51 rotates at least approximately in a vertical plane parallel to the transport direction indicated by an arrow 59.

Figure 3:
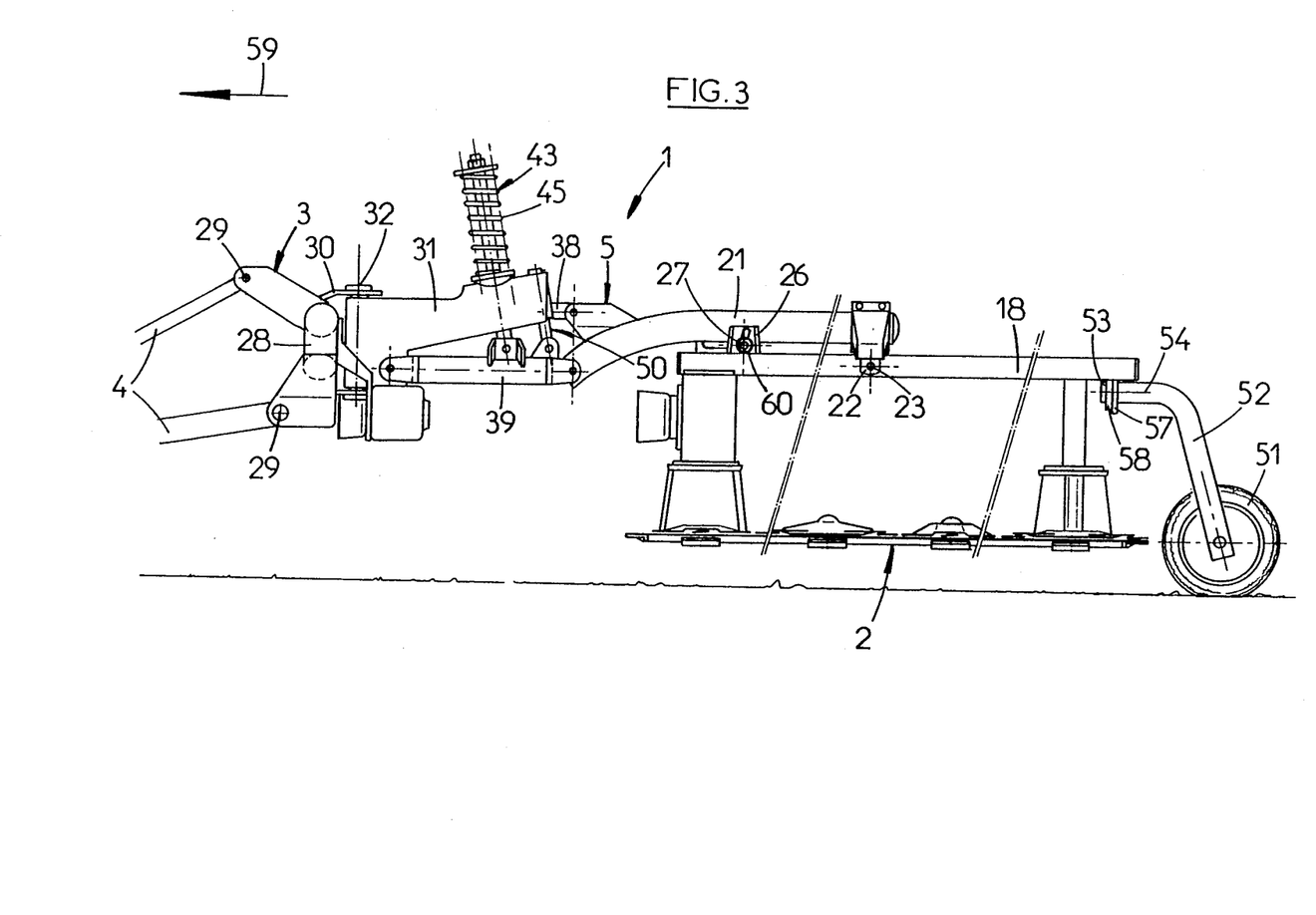
FIG. 3 is a side view of the mower of FIG. 1 in its transport position.
Figure 4:
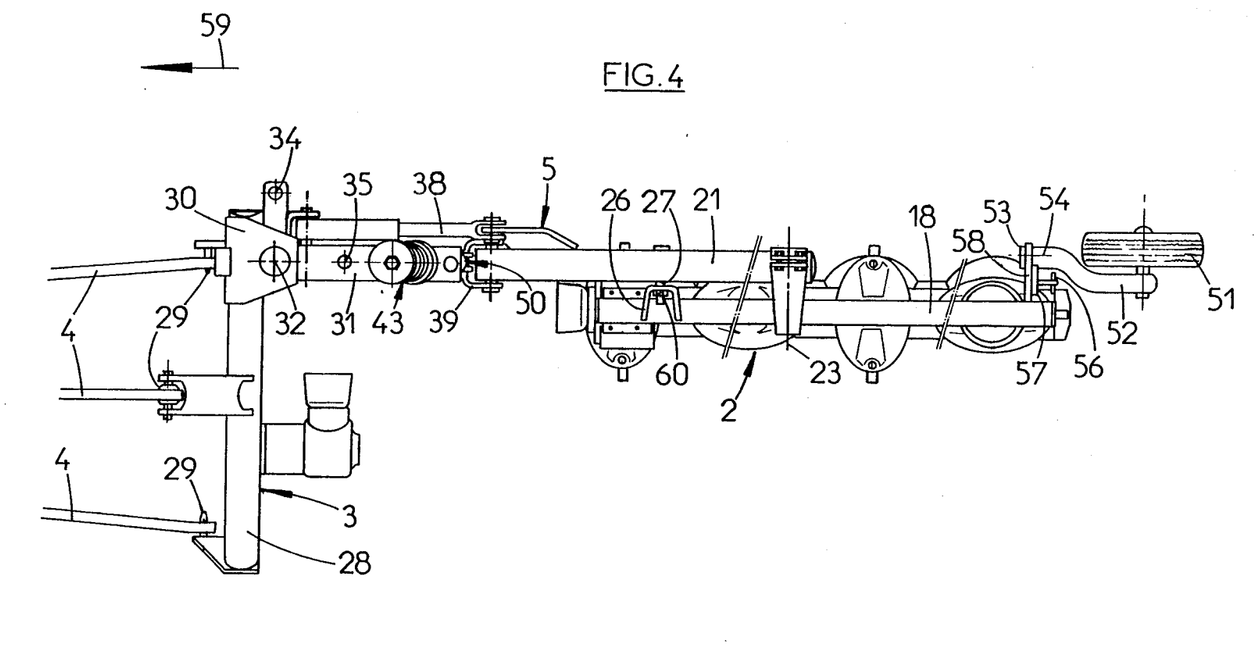
FIG. 4 is a top view of the mower of FIG. 1 in its transport position.

Furthermore, it is seen that the hitching structure 28 has been pivoted in relation to the rest of the elements of the mower 1 around the pivot pin 32. In this position, pivoting between the hitching structure 28 and the rest of the elements of the mower 1 is possible, and the position of those elements behind the tractor vehicle 4 is defined by the wheel 51. The machine thus behaves like a trailer, and, in curves, there is a possible pivoting between the hitching structure 28 and the rest of the elements of the mower 1 around the pivot pin 32.

In the transport position, the mowing group 2 is locked in relation to the connecting beam 21 (i.e., pivoting of the mowing group 2 relative to the connecting beam 21 is prevented). To do this, a nut 60 is screwed on the end of the index 27.

In FIG. 3, it is seen that the load-reducing mechanism 43 is also operational during transport. Therefore, an elastic connection exists between the wheel 51, the mowing group 2, the connecting device 5 and the hitching device 3. If the shock absorber device 50 is provided, the pivoting possible around this connection is also damped. Transport of the mower 1 is thus easier.

Figure 5:
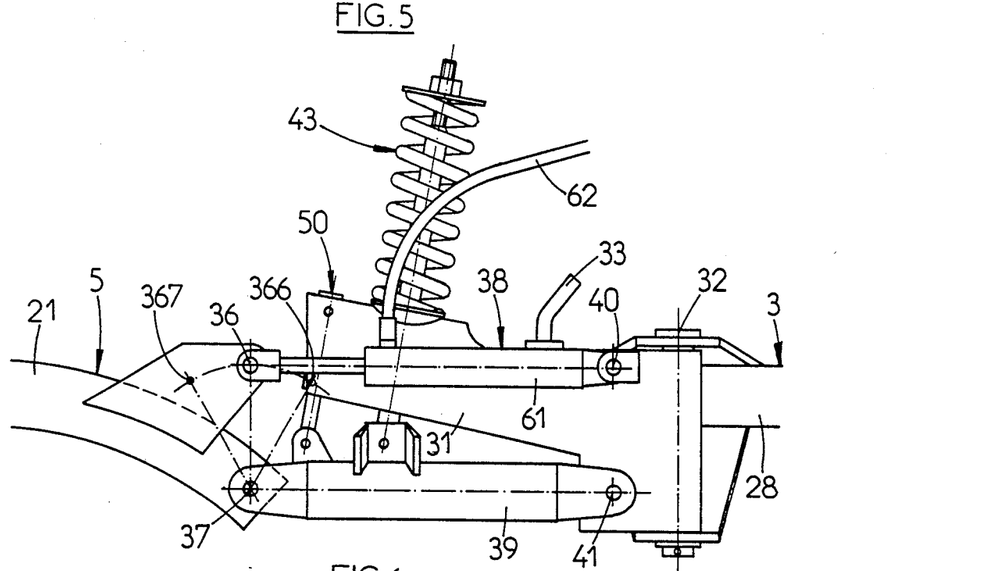
FIG. 5 is a front view on a larger scale of a second embodiment of the deformable quadrilateral of the mower according to the invention.

In FIG. 5, it is seen that the upper connecting bar 38 consists of an element that can be retracted or extended. The length of the upper connecting bar 38 is thus variable. In particular, the length of the upper connecting bar 38 can be adjusted as a function of the work to be performed. The element that can be retracted or extended is, in the example illustrated, a hydraulic jack 61 that is fed by a hydraulic pipe 62 connected, for example, to the hydraulic circuit of tractor vehicle 4.

Figure 6:
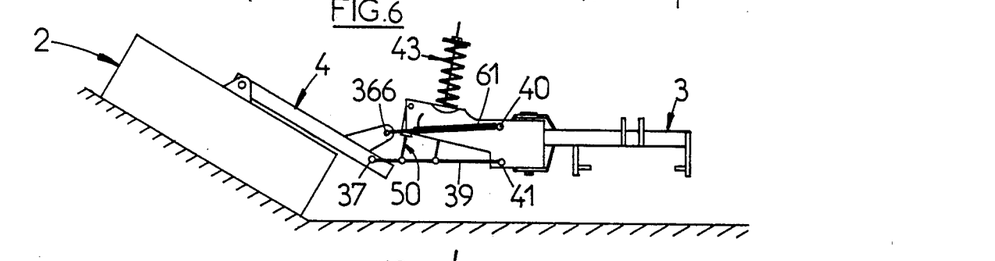
FIG. 6 is a diagrammatic view of a mower according to the invention equipped with the deformable quadrilateral of FIG. 5 mowing an upwardly inclined slope.

By injecting fluid into the hydraulic jack 61, its length shortens. The pin 36 which links the hydraulic jack 61 to the connecting beam 21 is thus brought into the position 366. This has the effect of causing the mowing group 2 to rotate around the pin 37 which links the lower connecting bar 39 to the connecting beam 21. The mowing group 2 then takes a position inclined upwardly, as illustrated in FIG. 6. It is thus possible to mow upwardly inclined slopes.

Figure 7:
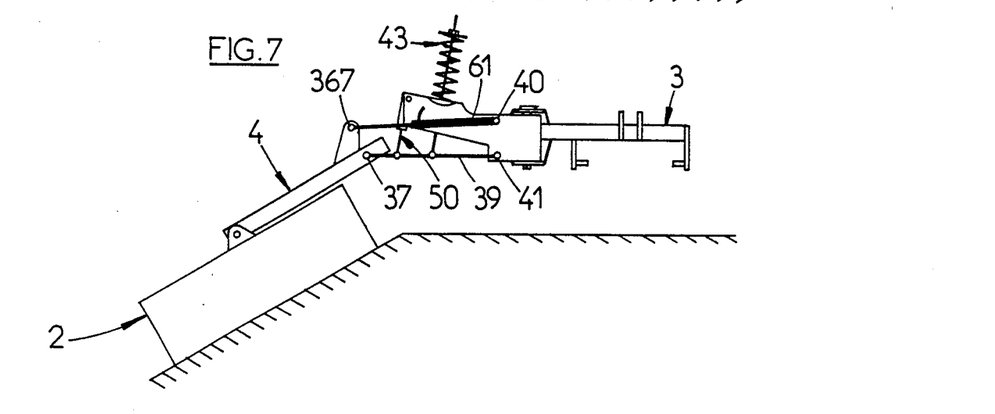
FIG. 7 is a diagrammatic view of a mower according to the invention equipped with the deformable quadrilateral of FIG. 5 mowing a downwardly inclined slope.

By releasing the fluid from the hydraulic jack 61, the weight of the mowing group 2 will cause the mowing group 2 to rotate around the pin 37 which links the lower connecting bar 39 to the connecting beam 21. This has the effect of lengthening the hydraulic jack 61 until the mowing group 2 rests on the ground. The pin 36 which links the hydraulic jack 61 to the connecting beam 21 can thus be brought into the position 367, which gives the mowing group 2 a position inclined downwardly, as illustrated in FIG. 7. It is thus possible to mow downwardly inclined slopes.

It will be understood that the shortening or lengthening of the hydraulic jack 61 depends on the inclination of the slope upwardly or downwardly.

FIGS. 8 to 12 diagrammatically show various other embodiments of the invention.

In these various figures, the hitching device 3, the upper and lower connecting bars 38 and 39, and the connecting beam 21 of the connecting device 5 are seen diagrammatically.

Figure 8:
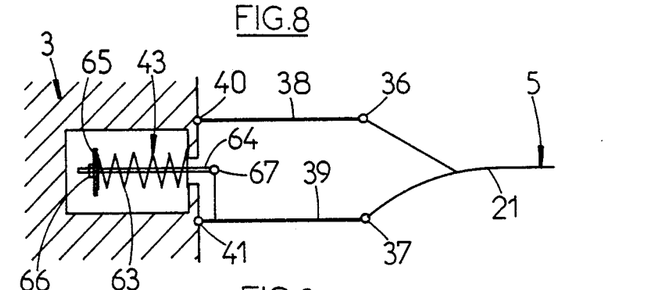
FIG. 8 is a diagrammatic view of a second embodiment of a load-reducing mechanism.

In FIG. 8, the load-reducing mechanism 43 comprises a compression spring 63. The compression spring 63 is housed inside the hitching device 3. A rod 64 passes through the compression spring 63. The compression spring 63 is compressed between the hitching device 3 and a washer 65 held by a nut 66 screwed on the end of the rod 64 which extends inside the hitching device 3.

The other end of the rod 64 is linked by means of a joint 67 to the lower connecting bar 39. The joint 67 is located in the vicinity of the vertical plane passing through the pin 41 which links the lower connecting bar 39 to the hitching device 3, and it is higher than the pin 41. The return force exerted by the compression spring 63 on the lower connecting bar 39 therefore does not create any significant additional compression in the lower connecting bar 39.

Figure 9:
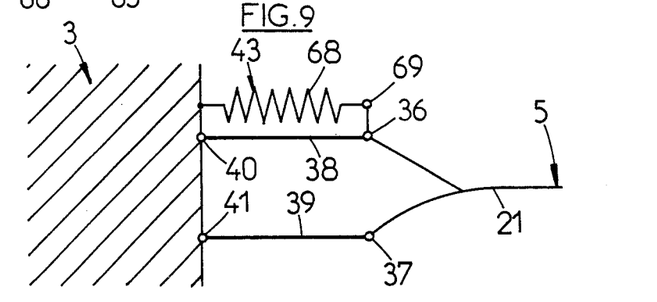
FIG. 9 is a diagrammatic view of a third embodiment of a load-reducing mechanism.

In FIG. 9, the load-reducing mechanism 43 comprises a tension spring 68. The tension spring 68 is linked at one of its ends to the hitching device 3. At its other end, the tension spring 68 is linked to the upper connecting bar 38 by means of a joint 69. The joint 69 is contained in the vertical plane passing through the pin 36 which links the upper connecting bar 38 to the connecting beam 21, and it is located higher than the pin 36.

The weight of the mowing group 2 introduces a pulling force into the upper connecting bar 38. The tension spring 68, on the other hand, introduces a compression force into the upper connecting bar 38 which counteracts the pulling force produced by the weight of the mowing group 2. The arrangement as described, therefore, also makes it possible to lighten the upper connecting bar 38.

Figures 10, 11, 12:
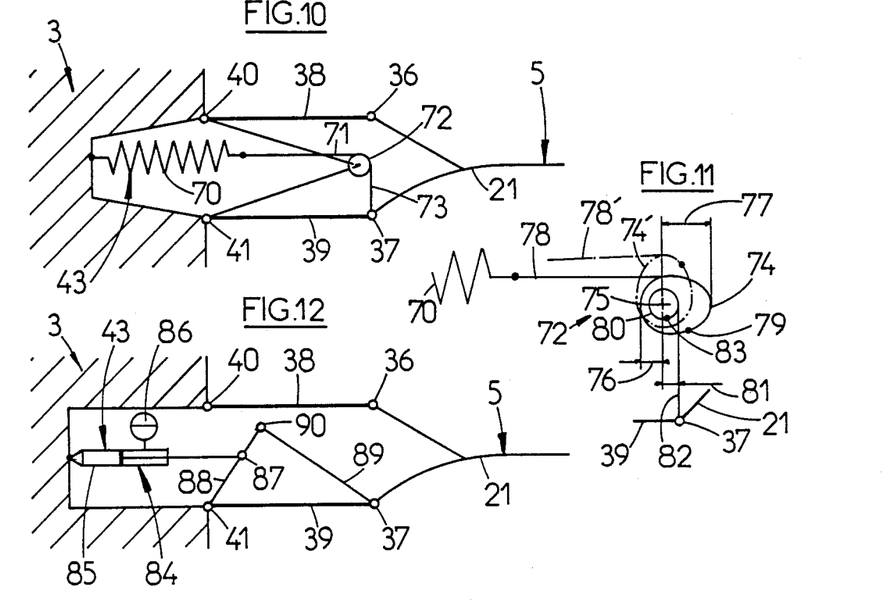
FIG. 10 is a diagrammatic view of a fourth embodiment of a load-reducing mechanism.
FIG. 11 is a diagrammatic view of a fifth embodiment of a load-reducing mechanism.
FIG. 12 is a diagrammatic view of a sixth embodiment of a load-reducing mechanism.

In FIG. 10, the load-reducing mechanism 43 comprises a tension spring 70. The tension spring 70 extends partially inside the hitching device 3. At one of its ends, the tension spring 70 is linked to the hitching device 3. At its other end, the tension spring 70 is linked to one of the ends of a flexible pulling element 71 (such as a cable, for example). The flexible pulling element 71 is wound partially on a guide 72 (such as a wheel, for example) which is mounted on the hitching device 3. At its other end, the flexible pulling element 71 is connected to the pin 37 which links the lower connecting bar 39 to the connecting beam 21. The portion 73 of the flexible pulling element 71 which extends between the guide 72 and the pin 37 extends in the vertical plane passing through the pin 37.

Since the tension spring 70 exerts its return force on the pin 37, and since the upper and lower connecting bars 38 and 39 are horizontal, the return force is at least approximately equal to the desired load-reducing force at the level of the mowing group 2.

Furthermore, since the return force exerted by the tension spring 70 is directed at least approximately vertically to the lower connecting bar 39, it does not introduce any significant additional compression force into the lower connecting bar 39.

In FIG. 11, another embodiment of the guide 72 is seen. This guide 72 comprises a first track 74 the off-centering of which in relation to the axis of rotation 75 of the guide 72 increases from a value 76 to a value 77. On the first track 74 is partially wound a first flexible pulling element 78 which is linked at one of its ends to the tension spring 70. The other end of the first flexible pulling element 78 is linked to the first track 74 by means of a fastening element 79.

Furthermore, the guide 72 has a second track 80 which is circular and has a radius 81. On the second track 80 is partially wound a second flexible pulling element 82 which is linked at one of its ends to the pin 37. The other end of the second flexible pulling element 82 is linked to the second track 80 by means of a fastening element 83. The radius 81 of the second track 80 is smaller than the values 76 and 77 of the first track 74. In this way, the return force developed by the tension spring 70 in FIG. 11 is reduced in relation to the force developed by the tension spring 70 of the embodiment of FIG. 10.

Furthermore, with this arrangement, a controllable load reduction can be produced (for example, an approximately constant load reduction) by giving the first track 74 the proper shape. In fact, when the mowing group 2 goes over an obstacle, the lower connecting bar 39 pivots upwardly around the pin 41. The tension spring 70 then pulls on the first flexible element 78, which causes the rotation of the guide 72 around the axis of rotation 75, which is directed at least approximately in the work direction indicated by the arrow 24 (position indicate in FIGURE 11 in dot -and- dash lines). By rotating, the eccentricity of first track 74 increases, so that the return force developed by the tension spring 70 acts on a longer lever arm. At the same time, the return force developed by the tension spring 70 has diminished, because the tension spring 70 is less stretched. The return torque (which is equal to the product of the return force and the length of the lever arm) can therefore be at least approximately constant if the percentage reduction of the return force is at least approximately compensate by the percentage increase of the eccentricity of the first track 74.

In FIG. 12, the load-reducing mechanism 43 comprises a hydropneumatic spring 84. The hydropneumatic spring 84 is composed of a jack 85 and a gas accumulator 86. The jack 85 is linked at one of its ends to the hitching device 3. The other end of jack 85 is linked by means of a joint 87 to a lever 88. The lever 88 is linked at one of its ends, in an articulated manner, to the pin 41. At its other end, the lever 88 is linked to the end of a pullrod 89 by means of a joint 90. At its other end, the pullrod 89 is linked, in an articulated way, to the pin 37. The lever 88 and the pullrod 89 thus form a knuckle joint by which the hydropneumatic spring 84 pulls on the deformable quadrilateral formed by the hitching device 3, the upper and lower connecting bars 38 and 39, and the connecting beam 21. Specifically, the hydropneumatic spring 84 tends to cause the upper and lower connecting bars 38 and 39 and the connecting beam 21 to rise.

In the invention, it is possible to make all the possible combinations using components of the various embodiments that have just been described. Furthermore, one will not be going outside the scope of the invention by making modifications or improvements to the various embodiments described.

What is claimed as new and desired to be secured by Letters Patent of the United States is:

1. A mower to be pulled in a work direction by a tractor vehicle, said mower comprising:
    (a) a mowing group which slides during work on the ground and which has a center of gravity;
    (b) a hitching device for hitching said mower to said tractor vehicle in use;
    (c) a connecting device for linking said mowing group to said hitching device, said connecting device comprising:
        (i) a connecting beam having an outboard end and an inboard end, said outboard end of said connecting beam fastened to said mowing group by means of a single joint including a pin directed at least approximately in said work direction and extending at least approximately in the vicinity of a vertical plane passing through the center of gravity of said mowing group; and
        (ii) two connecting bars connected respectively to said inboard end of said connecting beam and to said hitching device by means of pins directed at least approximately in said work direction so as to form, with said hitching device and said connecting beam, a deformable quadrilateral; and
    (d) a load-reducing mechanism for said mowing group, said load-reducing mechanism comprising an elastically deformable element, said elastically deformable element extending at least between two sides of said deformable quadrilateral so as to create at the level of the connection between said connecting beam and said mowing group a force directed upwardly.

2. A mower according to claim 1 wherein said elastically deformable element extends between said hitching device and at least one of the other three sides of said deformable quadrilateral.

3. A mower according to claim 1 wherein said deformable quadrilateral is at least approximately a parallelogram.

4. A mower according to claim 1 wherein said elastically deformable element is linked to at least one of said two connecting bars.

5. A mower according to claim 4 wherein:
(a) one of said two connecting bars is an upper connecting bar and the other one of said two connecting bars is a lower connecting bar and
(b) said elastically deformable element is linked to said lower connecting bar.

6. A mower according to claim 4 wherein said two connecting bars are normally at least approximately horizontal.

7. A mower according to claim 4 wherein:
(a) said elastically deformable element exerts a return force on said one of said two connecting bars and
(b) said return force is directed at least approximately parallel to said one of said two connecting bars.

8. A mower according to claim 7 wherein:
(a) said elastically deformable element exerts said return force on a point of application on said one of said two connecting bars and
(b) said point of application is located on said one of said two connecting bars such that it does not introduce any unwanted force in said one of said two connecting bars.

9. A mower according to claim 8 wherein:
(a) one of said two connecting bars is an upper connecting bar and the other one of said two connecting bars is a lower connecting bar;
(b) said elastically deformable element is linked to said lower connecting bar; and
(c) the point of application of the return force is located at least approximately in the vicinity of a vertical plane passing through said pin connecting said lower connecting bar to said hitching device.

10. A mower according to claim 4 wherein:
(a) said elastically deformable element exerts a return force on said one of said two connecting bars and
(b) said return force is directed upwardly.

11. A mower according to claim 10 wherein the return force exerted by said elastically deformable element on said one of said two connecting bars is directed at least approximately perpendicularly to said one of said two connecting bars.

12. A mower according to claim 10 wherein:
(a) said elastically defomrable element exerts the return force on a point of application on said one of said two connecting bars and
(b) said point of application is located in the vicinity of a vertical plane passing through said pin connecting said one of said two connecting bars to said connecting beam.

13. A mower according to claim 12 wherein said point of application is located in a vertical plane passing through said pin connecting said one of said two connecting bars to said connecting beam.

14. A mower according to claim 10 wherein said elastically deformable element exerts the return force on said one of said two connecting bars by at least one flexible pulling element which is wound at least partially on a guide mounted on said itching device.

15. A mower according to claim 14 wherein said guide is a wheel.

16. A mower according to claim 14 wherein:
(a) one of said two connecting bars is an upper connecting bar and the other one of said two connecting bars is a lower connecting bar;
(b) said guide can rotate around an axis of rotation; and
(c) said guide comprises two tracks, a first track on which is wound at least partially and to which is linked a first flexible pulling element linked furthermore to said elastically deformable element, so that said elastically deformable element exerts a return torque on said guide, said first track having an eccentricity that is variable so that said return torque exerted by said elastically deformable element remains at least approximately constant when said guide rotates around said axis of rotation, and a second track on which is wound at least partially and to which is linked a second flexible pulling element linked furthermore to said deformable quadrilateral, said second track having a eccentricity in relation to said axis of rotation of said guide that is at least approximately constant.

17. A mower according to claim 10, wherein said elastically deformable element exerts said return force on said deformable quadrilateral by a knuckle joint.

18. A mower according to claim 7, 14, or 17 wherein said elastically deformable element extends at least approximately horizontally.

19. A mower according to claim 18 wherein:
(a) said hitching device occupies a space and
(b) said elastically deformable element is housed at least partially inside said space.

20. A mower according to claim 1 wherein said elastically deformable element is constituted by a mechanical spring or a hydropneumatic spring.

21. A mower according to claim 1 wherein a shock absorber device extends at least between two sides of said deformable quadrilateral.

22. A mower according to claim 21 wherein said shock absorber device extends between said hitching device and at least one of the other three sides of said deformable quadrilateral.

23. A mower according to claim 22 wherein said shock absorber device is linked to one of said two connecting bars.

24. A mower according to claim 23 wherein:
(a) one of said two connecting bars is an upper connecting bar and the other one of said two connecting bars is a lower connecting bar and
(b) said shock absorber device is linked to said lower connecting bar.

25. A mower according to claim 23 wherein said shock absorber device extends at least approximately perpendicularly to said one of said two connecting bars.

26. A mower according to claim 25 wherein:
(a) said shock absorber device is connected to said one of said two connecting bars by a connecting point and
(b) said connecting point is located in the vicinity of a vertical plane passing through the associated one of said pins connecting said one of said two connecting bars to said connecting beam.

27. A mower according to claim 26 wherein said connecting point of said shock absorber device on said one of said two connecting bars is located in a vertical plane passing through said associated one of said pins connecting said one of said two connecting bars to said connecting beam.

28. A mower according to claim 1 wherein one of said two connecting bars has a variable length.

29. A mower according to claim 28 wherein:
(a) one of said two connecting bars is an upper connecting bar and the other one of said two connecting bars is a lower connecting bar and
(b) the length of said upper connecting bar is variable.

30. A mower according to claim 28 wherein said one of said two connecting bars comprises an element that can be extended or retracted.

31. A mower according to claim 1 wherein:
(a) said hitching device comprises a hitching structure and a support element which is linked to said hitching structure by means of a pin directed upwardly and
(b) said support element and said two connecting bars are linked so that said support element can pivot together with said connecting bars, said connecting beam, and said mowing group in relation to said hitching structure around said pin.

32. A mower according to claim 31 wherein:
(a) said mowing group is in a transport position after said mowing group has been pivoted around said pin by which said support element is linked to said hitching structure and
(b) in said transport position of said mowing group, said load-reducing mechanism remains operational and creates an elastic connection between said mowing group and said hitching device.

33. A mower according to claim 32 wherein said mowing group is supported in part during transport by at least one wheel which can be raised during work.

34. A mower according to claim 33 wherein:
(a) said at least one wheel is mounted on an outboard end of said mowing group by means of a joint the axis of which is directed crosswise to said work direction;
(b) the positioning for work and the positioning for transport of said at least one wheel is performed by pivoting said at least one wheel around said axis; and
(c) said at least one wheel is locked in its transport position and in its work position by a bolt.

35. A mower according to claim 33 wherein:
(a) in its work position, the rotation of said support element in relation to said hitching structure is prevented by a bolt and,
(b) in its transport position, the rotation of said support element in relation to said hitching structure is free.

* * * * *